June 10, 1941.   H. W. SIMPSON   2,245,448
MOWER STRUCTURE
Filed Jan. 22, 1940   4 Sheets-Sheet 1
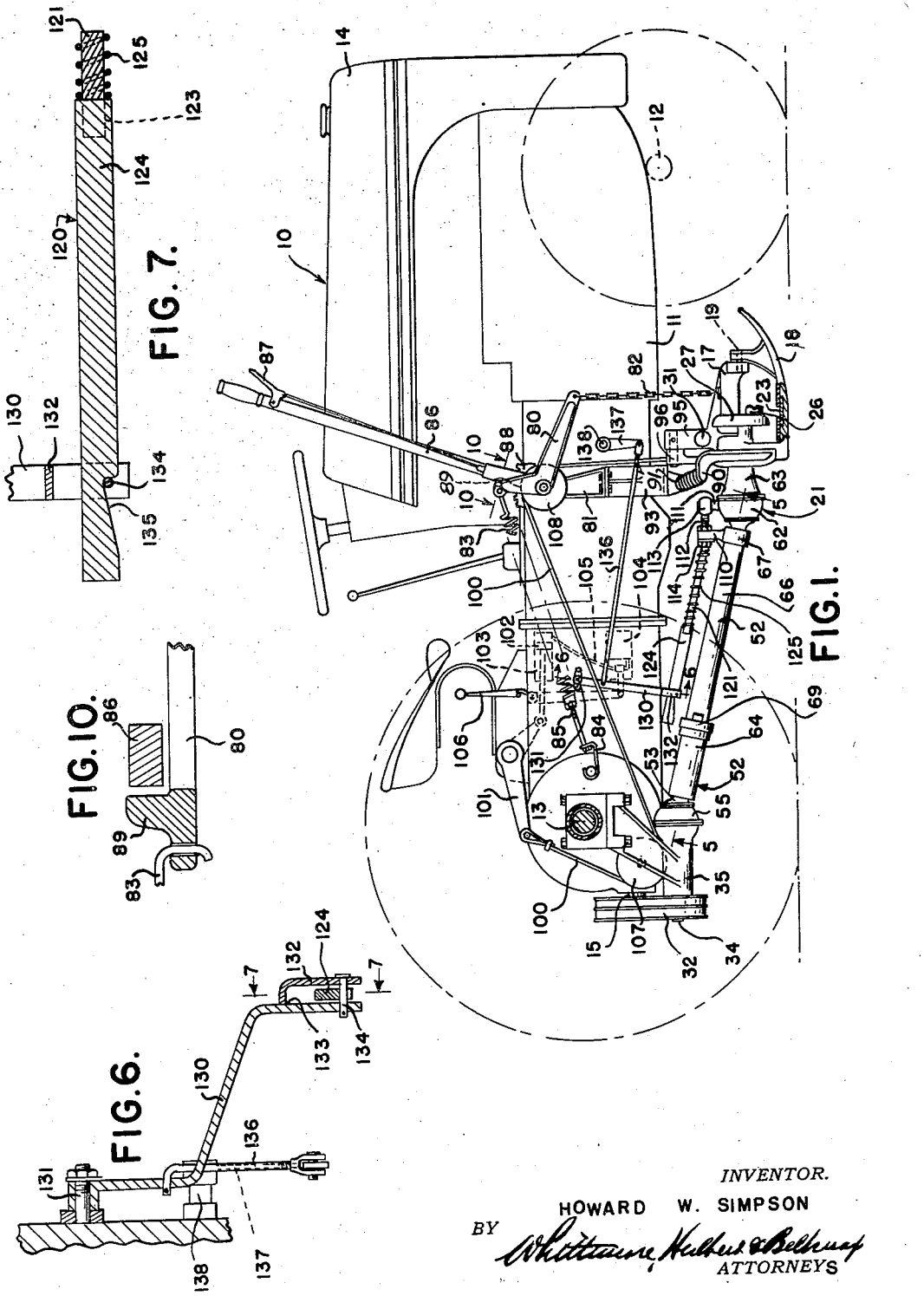
INVENTOR.
HOWARD W. SIMPSON
BY
ATTORNEYS June 10, 1941.  H. W. SIMPSON  2,245,448
MOWER STRUCTURE
Filed Jan. 22, 1940  4 Sheets-Sheet 2
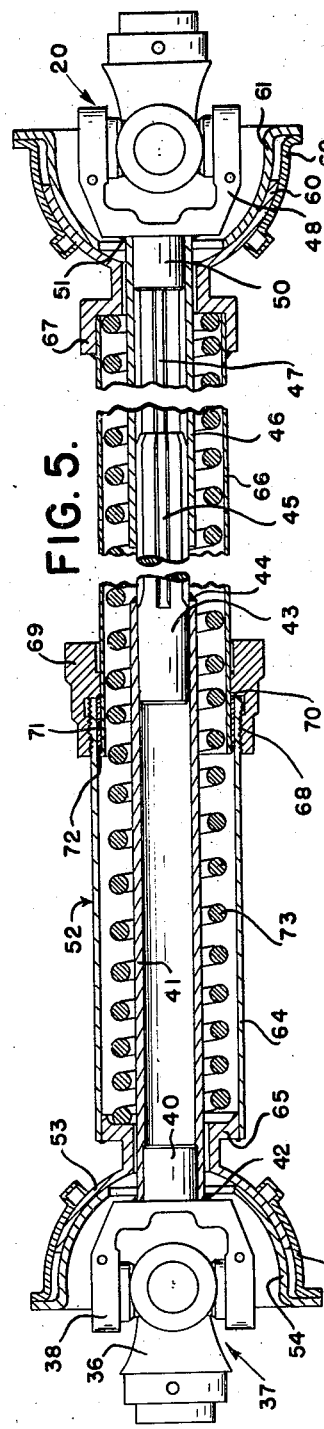
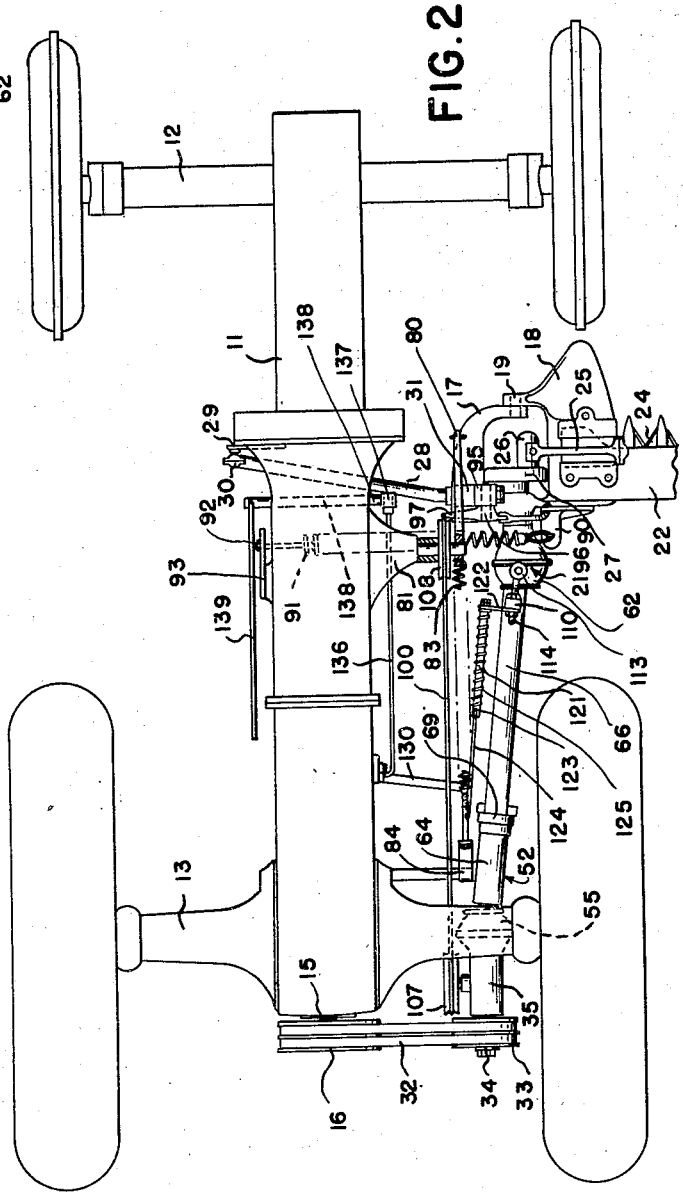
INVENTOR.
HOWARD W. SIMPSON
BY
ATTORNEYS June 10, 1941.  H. W. SIMPSON  2,245,448
MOWER STRUCTURE
Filed Jan. 22, 1940    4 Sheets-Sheet 3

INVENTOR.
HOWARD W. SIMPSON

June 10, 1941. H. W. SIMPSON 2,245,448
MOWER STRUCTURE
Filed Jan. 22, 1940 4 Sheets-Sheet 4

INVENTOR.
HOWARD W. SIMPSON
BY
ATTORNEYS

Patented June 10, 1941

2,245,448

UNITED STATES PATENT OFFICE 2,245,448

MOWER STRUCTURE

Howard W. Simpson, Dearborn, Mich., assignor to Detroit Harvester Company, Detroit, Mich., a corporation of Michigan Application January 22, 1940, Serial No. 315,112

19 Claims. (Cl. 56—25)

The present invention relates to a mower structure and more particularly to a combined tractor-mower in which the mower is power driven from a power take-off on the tractor.

The mower arm is arranged intermediate the front and rear wheels of the tractor and is mounted for vertical swinging movement relative to a support. The support is mounted for limited vertical movement and for limited rearward movement. Means are provided effective upon rearward movement of the support to disengage the clutch to arrest forward motion of the tractor.

Novel means are provided for transmitting power from the power take-off of the tractor to the mowing mechanism, comprising a telescoping torque transmitting shaft and a telescoping tubular housing therefor.

Novel means are provided, including a hydraulically actuated lever on the tractor together with a novel arrangement of parts for first swinging the mowing arm to substantially vertical position and then effecting vertical movement of the mower arm support.

Further novel means are provided for adjusting the angularity of the mowing arm about a transverse horizontal axis to regulate the height of cut. In addition, the entire mowing structure is arranged for ready attachment and detachment, pinned connections being provided.

The foregoing comprises the principal objects of the invention, and other objects of the invention will be apparent as the description proceeds, and when taken in conjunction with the accompanying drawings wherein:

Figure 1 is a side elevation of my combined tractor-mower with parts broken away for clearness;

Figure 2 is a top plan view of my improved tractor-mower combination with parts broken away for clearness;

Figure 5 is a longitudinal section of the torque transmitting shaft and the housing therefor;

Figure 6 is a section on the line 6—6 of Figure 1;

Figure 7 is a section on the line 7—7 of Figure 6;

Figure 10 is a section on the line 10—10, Figure 1.

Figure 3:
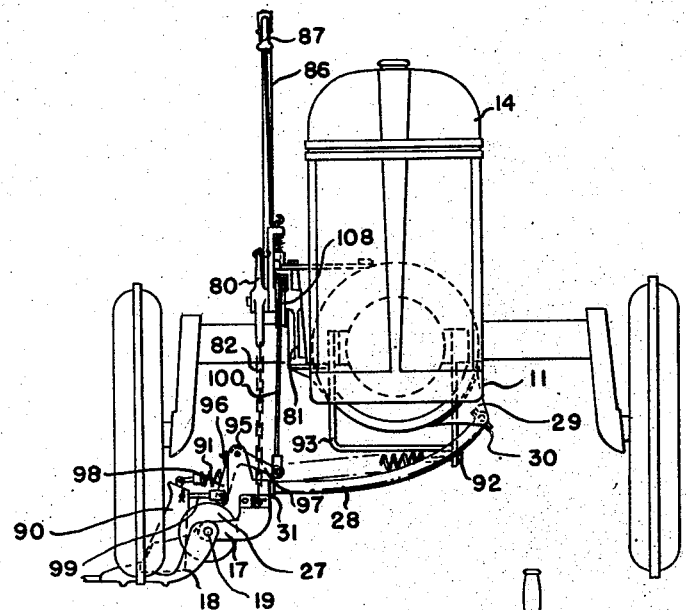
Figure 3 is a front elevation of my improved tractor-mower.

Referring first to Figures 1 to 7, I have illustrated generally at 10 a tractor comprising a main frame 11 having a front axle 12 and a rear axle 13. Suitable motor means are provided within a hood 14, and are adapted both to drive the tractor forwardly and rearwardly through suitable transmission means including a conventional clutch. The motor means is also adapted to drive the power take-off, including a shaft 15 and sheave 16.

The mower mechanism comprises a support 17 to which is secured an inner shoe 18. The shoe 18 is pivoted to the support for vertical swinging movement about an axis defined by the pivot connection indicated at 19 in Figure 2 and the center of a universal joint 20 within a universally adjustable housing 21.

Rigidly secured to the shoe 18 is a mower arm 22 in which is mounted for longitudinal reciprocation a sickle bar 23 carrying the cutting sectors 24 shown in Figure 2. The sickle bar 23 is connected by a pitman 25 with a crank pin 26 carried by a crank 27 which is driven from the power take-off in a manner which will subsequently be described.

The support 17 is connected to the frame 11 of the tractor by a bar 28 which is secured to the frame of the tractor by a bracket 29 and a universal connection 30. Accordingly, the bar 28 limits movement of the support 17 about the center of the universal joint 30. The connection between the bar 28 and the support 17, as indicated at 31 in Figure 3, permits adjustment of the support 17 about a transverse horizontal axis, as will subsequently be described.

The power take-off shaft 15, previously referred to, is connected by a plurality of V-belts or other suitable drive means 32 to a plurality of sheaves 33 mounted on a shaft 34. The shaft 34 is mounted in a housing 35 rigidly secured as by bolting or otherwise to the rear axle 13 of the tractor, all as best seen in Figure 1. The shaft 34 carries at one end thereof one element 36 of a torque transmitting universal joint 37, the other element 38 being connected to the torque transmitting shaft which transmits the power to the crank 27. As best seen in Figure 5, the element 38 of the universal joint has a stub section 40 which is received within a torque transmitting tubular member 41 rigidly secured thereto as by welding or the like, as indicated at 42.

The tubular member 41, at its opposite end, carries a shaft 43 rigidly secured thereto as indicated by the welded connection 44. Shaft 43 is splined as indicated at 45, and is received within a second tubular shaft 46 correspondingly splined, as indicated at 47, which is permanently secured to one element 48 of the universal joint 20 previously referred to. The connection between the tubular shaft 46 and the element 48 of the universal joint is indicated as comprising a short section 50 received within tubular shaft 46 and as including a welded connection 51. It will be evident that a torque will be transmitted from the single element 38 to the universal joint element 48 through the medium of the tubular member 41, shaft 43, and tubular shaft 46. At the same time the parts are telescopically arranged, the tubular shaft 46 being adapted to slide longitudinally over the splined shaft 45.

In order to protect the torque transmitting telescopic shafts just described, the tubular housing indicated generally at 52 is provided. This comprises a spherically formed cap 53 cooperating in universally adjusted relation with a spherically formed inner shell 54 and a spherically formed outer shell 55. Shells 54 and 55, as indicated in Figure 1, are secured to the shaft housing 35, and cooperate therewith to form a complete housing for the universal joint 37. At the opposite end of the torque transmitting assembly is a spherically formed shell 60 cooperating in universally adjusted relation with a spherically formed inner shell 61 and an outer shell 62. Shells 61 and 62, as best indicated in Figure 1, are rigidly secured to a crank shaft housing 63 with which they form the housing 21 for the universal joint 20. Housing 63 is in turn rigid with the support 17.

Intermediate the spherically formed shells 53 and 60, I provide a tubular member 64 welded or otherwise secured to a flange 65 on shell 53, and a cooperating tubular member 66 welded or otherwise secured within a flange 67 formed on the shell 60. Tubular member 66 is slidably received within the tubular member 64 in telescoping relation. The opposite end of the tubular member 64 is threaded as indicated at 68 and receives a tubular nut 69 having an annular inwardly projecting shoulder 70 formed thereon. Tubular member 66 at the end received within the tubular member 64 has an annular abutment 71 permanently secured thereto, as indicated by the soldered connection 72. The annular abutment 71 is adapted to engage the inwardly extending shoulder 70 on the lock nut 69 and to limit extension of the housing 52.

A compression spring 73 is received within the housing 52 surrounding the torque transmitting drive shaft assembly and its ends are adapted to abut the flange 65 of the shell 53 and a shoulder within the flange 67 of the shell 60. This compression spring 73 is of sufficient strength so that under normal operative conditions it retains the abutment 71 in engagement with the inwardly extending shoulder 70, thus keeping the telescoping drive shaft and housing assembly fully extended. Under abnormal conditions of strain, however, the spring 73 is adapted to yield and permit rearward movement of the support 17 previously referred to. Thus, for example, when the mower arm 22 strikes an immovable object, the support 17 yields rearwardly, thus cushioning the shock and also releasing the clutch by means of which will subsequently be described. Preferably the coil spring 73 received within the shaft housing 52 is of such dimensions that the adjacent convolutions thereof may contact with each other to limit collapse of the housing 52 of the associated telescoping shafts 41 and 46.

As best seen in Figures 1 and 3, the support 17 is limited as to downward movement and is continuously urged upwardly by means of a bell crank 80 pivoted to a bracket 81 carried by the frame of the tractor. The bell crank 80 is connected to the support 17 as by means of a chain 82, and is urged in a counterclockwise direction, as seen in Figure 1, by a spring 83 connected to a bracket 84 secured to the frame of the tractor adjacent the rear axle. Suitable means indicated at 85 are provided for adjusting the tension of the spring 83.

Figure 4:
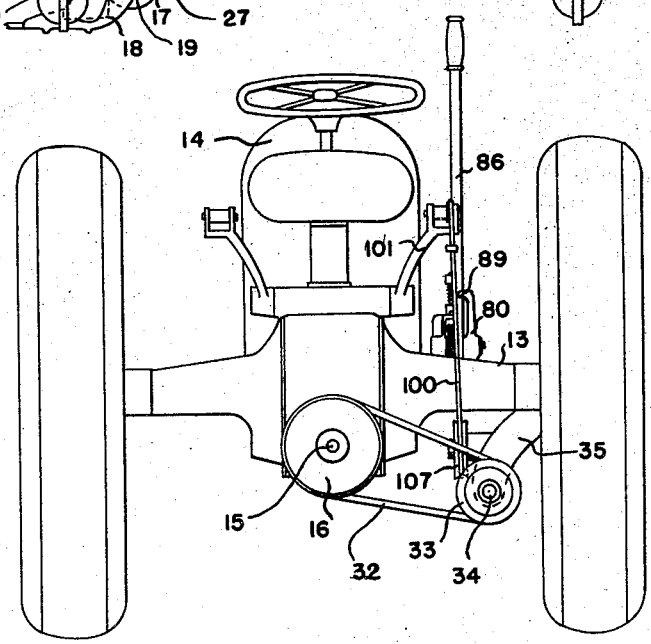
Figure 4 is a rear elevation of my improved tractor-mower.

The bell crank 80 as thus far described is adapted to apply a lifting force continuously to the support 17, but the force exerted by the spring 83 is less than sufficient to completely counterbalance the weight of the support 17 and its associated structure. Manual means are provided for further actuating the bell crank 80, and these take the form of a lever 86 having locking means actuated by the release 87 associated with a toothed sector 88. The bell crank 80, as best seen in Figures 4 and 10, has an offset portion 89 extending into the path of movement of the lever 86. As a result, movement of the lever 86 rearwardly, as seen in Figure 1, results in positive rotation of the bell crank 80 and positive lifting of the support 17. By this means it is possible to limit the downward position of the support 17. Since the offset portion 89 engages lever 86 at one side only, upward movement of the support 17, due to external causes such as riding over a high point on the ground, is permitted. This upward movement of the support 17 permits bell crank 80 to rotate under the influence of spring 83, thus causing offset portions 89 to move away from lever 86. As soon as the support 17 passes over the high point on the ground, it drops down to its initial position, determined by the setting of lever 86, where offset portion 89 again abuts lever 86.

Referring now particularly to Figure 3, the shoe 18 is provided with a vertically upstanding arm 90, by means of which the shoe and the associated mower arm are adapted to be swung upwardly. Secured to the upper end of the arm 90 is a tension spring 91, the opposite end of which is secured as indicated at 92 to a bracket 93 secured to the frame of the tractor and to which in turn is secured the bracket 81 previously referred to. As best seen in Figure 1, the tension spring 91 exerts a clockwise moment on the shoe 18, and counterbalances a portion of the weight thereof. The spring 91 is selected so that it is insufficient to actually raise the mower arm, but it counterbalances a major portion of the weight thereof and permits the mowing arm to rest lightly on the ground. As a result, springs 91 and 83 together insure that the mowing arm as a whole will rest lightly on the ground, with the spring 83 counterbalancing a large portion of the weight of the assembly at the inner end and exerting a direct lift thereon, and the spring 91 exerts a lifting moment which tends to swing the mowing arm vertically.

The support 17 has an upstanding lug 95 to which is pivoted a bell crank 96 having a generally horizontally extending arm 97 and a generally vertically extending arm 98. The arm 98 is connected by a link 99 to the arm 90 of the inner shoe 18, and the generally horizontally extending arm 97 is connected to a cable 100 for effecting a power lift.

It will be evident that when the cable 100 is drawn upwardly as seen in Figure 3, the bell crank 96 will be rocked in a counterclockwise direction. This will be effective to swing the shoe 18 about the pivoted axis 19, thus swinging the mowing arm 22 into substantially vertical position. Further upward movement of the cable 100, as seen in Figure 3, will result in a direct lift on the support 17, thus lifting the support out of contact with the ground into a position which it will occupy when it is desired to move the tractor from point to point without performing the mowing operation.

Referring now particularly to Figure 1, the means for effecting the power lift comprises a hydraulically actuated lever 101 which is actuated from a piston 102 received within a hydraulic cylinder 103. The tractor carries a pump 104 connected to the cylinder 103 by a suitable conduit 105, and manually operable means indicated herein as a lever 106 is provided for energizing the hydraulic means. The arrangement is such that upon movement of the lever 106 in one direction, the hydraulically actuated lever 101 swings to one extreme position and returns to its original position upon movement of the manual control lever 106 to its other position. The details of this arrangement form no part of the present invention, and in fact the hydraulically actuated lever 101 is standard equipment on this type of tractor.

The lever 101 is directly connected to the cable 100 which is led around a sheave 107 carried by the housing 35 previously described. The cable 100 also leads over a sheave 108 carried by the mounting for the bell crank 80 and the manual lever 86, and from the sheave 108 leads substantially vertically downwardly to the generally horizontal arm 97 of the bell crank 96.

The means for supporting the mowing apparatus in operative position have now been described and may advantageously be reviewed at this point. The support 17 is connected to the tractor frame by the bar 28 which permits limited universal movement thereof. The support 17 is connected to the frame of the tractor by the tubular housing 52 and is urged into extreme forward position by compression spring 73. This forward position is limited by engagement of the abutment 71 with the annular flange 70 of the lock nut 69. The parts thus far described therefore, effectively limit normal motion of the support 17 to substantially vertical movement about the center of the pivot connection 30. Rearward movement thereof under unusual circumstances is permitted by collapse of the spring 73. Downward movement of the support 17 is limited by means of the chain 82, the bell crank 80, the offset projection 89 on the bell crank, and the manual lever 86. In addition a portion of the weight of the support 17 and the associated structure is counterbalanced by means of the spring 83 which acts vertically upwardly on the support 17. Furthermore, a lifting moment which counterbalances a portion of the weight of the mower arm 22 is applied through the medium of the arm 90 by means of the spring 91.

As previously stated, the support 17 is adjustable about a transverse horizontal axis and specifically about the connection 31 between said support and the supporting bar 28. In order to provide this adjustment, an arm 110 is provided on the flange 67 of the shell 60, and the cooperating arm 111 is provided on the outer shell 62 of the housing for the universal joint 20, all as best illustrated in Figure 1.

An adjustable link 112 interconnects the arms 110 and 111, having for this purpose a universal connection indicated at 113. I have illustrated the adjustment as being provided by a pair of lock nuts 114. As will be evident from this figure, adjustment of the nuts 114 provides an angular adjustment between housing 52 and the support 17. This has the effect of swinging the support 17 about the connection 31 so that the mower arm 22 will be tilted relative to the ground to vary the height of cut made by the sickle bar 23 of the assembly.

As previously stated, automatic means are provided for disengaging the clutch of the tractor transmission when the mower arm encounters severe resistances. This takes the form of an actuating element 120 which includes a rod 121 slidably associated with a bracket 122, which for convenience is secured to the arm 110 by one of the lock nuts 114. The rod 121 is bifurcated as indicated at 123, and a flat bar 124 is permanently attached thereto. A compression spring 125 surrounds the rod 121, abutting at one end against the corners of the flat bar 124 and seating at the other end against the bracket 122. This spring is adapted upon the application of abnormal force to permit the rod 121 to slide forwardly through the eye in the bracket 122, as can be seen in Figure 2. Its strength is however sufficient to first actuate and release the tractor clutch, as will now be described.

Referring now to Figures 1, 6 and 7, a lever 130 is pivoted to the frame of the tractor as indicated at 131. The free end of the lever 130 has a plate 132 secured thereto, a welded connection 133 being indicated in Figure 6. A pin 134 spans the space between the free end of the lever 130 and the plate 132. The flat bar 124, as best seen in Figure 7, is provided with a notch 135 adapted to cooperate with the pin 134. Rearward movement of the support 17 effects a corresponding rearward movement of the bracket 122, which effects a corresponding swinging movement of the lever 130. The lever 130 has connected thereto a link 136 which extends forwardly of the tractor and connects through the medium of a lever 137 to the clutch actuating shaft 138, as indicated in Figure 2. The shaft 138 is normally actuated by the operator of the vehicle through a link 139 connected to a conventional clutch operated pedal, as is well understood.

It will be evident when the tractor is in forward motion, and when the mowing arm encounters severe resistance, the support 17 moves rearwardly and results in a corresponding rearward motion of the clutch actuating element 120. This effects rearward swinging of the lever 130 and a corresponding rotation of the clutch actuating shaft 138. Further rearward movement of the support 17 after actuation of the clutch actuating shaft 138 results in compression of the spring 121.

Figure 9:
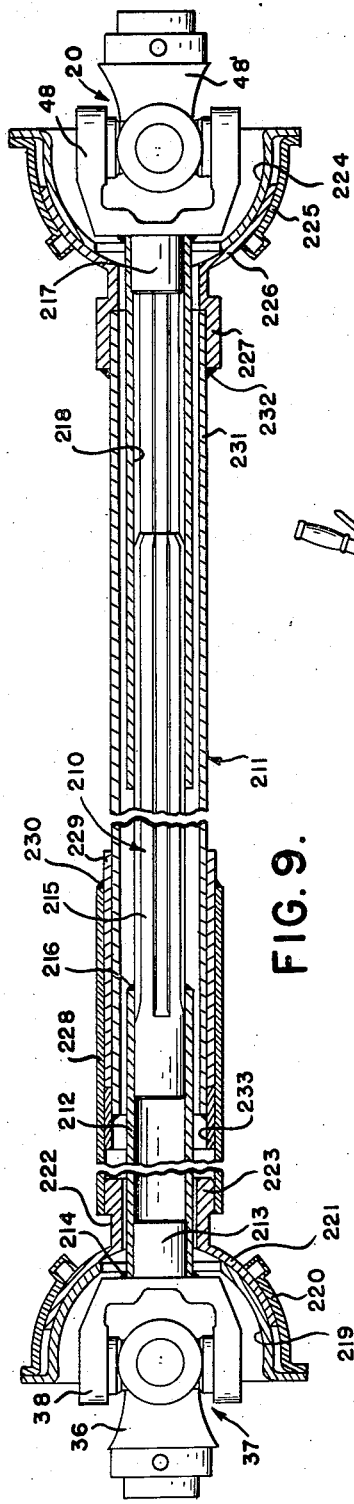
Figure 9 is a longitudinal section of a somewhat different embodiment of torque transmitting shaft and housing therefor.
Figure 8:
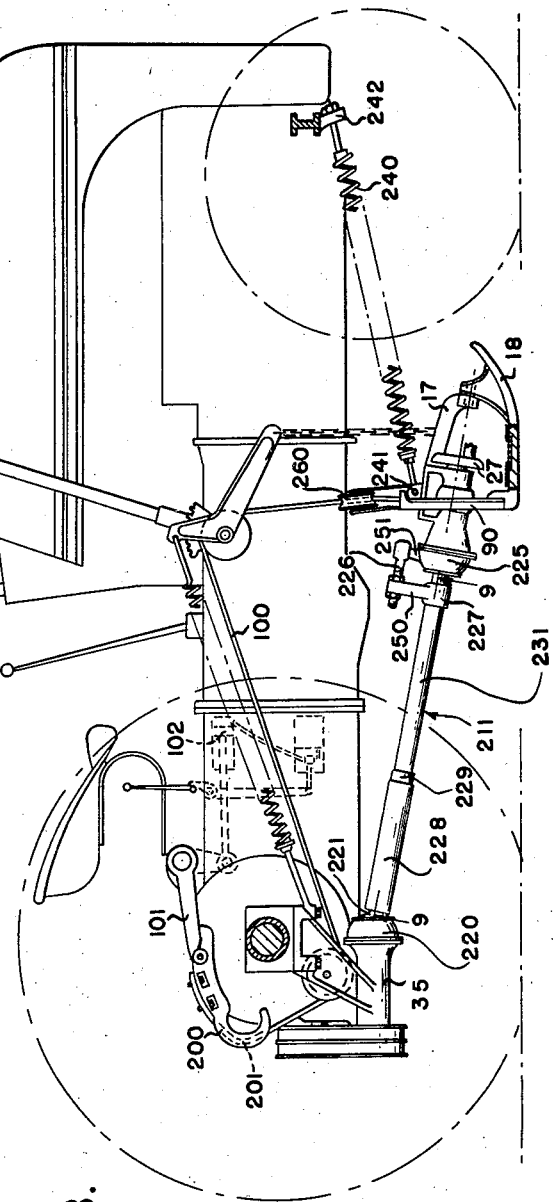
Figure 8 is a side elevation with parts in section of a somewhat different embodiment of my improved tractor-mower combination.

In Figures 8 and 9 I have illustrated a somewhat different embodiment of my invention. This embodiment is for the most part substantially similar to the embodiment previously described, and accordingly the description thereof will be limited to the points that differ. In this modification the power lift is somewhat modified, an extension 200 being secured to the hydraulically actuated lever 101. The lifting cable 100 leads over an arcuately formed recess 201 in the extension 200 and is adapted to operate substantially the same as in the previous embodiment. Movement of the lever 101 in a clockwise direction under the impulse of the hydraulically actuated piston 102 swings the lever 101 and its extension 200 in a direction to draw the cable upwardly and to first swing the mower arm 22 to substantially vertical position and then to lift the support 17 substantially vertically.

In this embodiment of my invention I have provided a somewhat different arrangement of mechanism for transmitting torque from the power take-off to the crank 27.

Referring now to Figure 9, I have illustrated the universal joint 37 as comprising elements 36 and 38, and the universal joint 20 as comprising the elements 48 and 48'. The element 48', as will be understood, is connected directly to a shaft for rotating the crank 27. The torque transmitting means is indicated generally at 210 and the housing means is indicated generally at 211. The torque transmitting means comprises a short tubular shaft 212 carried by a suitable section 213 of the universal joint element 38. I have illustrated at 214 a welded connection between the stub section 213 and the tubular shaft 212. The shaft 212 in addition carries a splined shaft 215 which is rigidly secured thereto as by means of the welded connection indicated at 216. At the opposite end the universal joint element 48 is provided with a similar stub section 217 to which is permanently secured an internally splined tubular shaft 218 which is adapted to receive the splined shaft 210 in a telescoping and torque transmitting relation.

The universal joint 37 is housed in part by the housing element 35 and in part by an inner spherically formed shell 219 and a cooperating outer spherically formed shell 220. The housing for the universal joint 37 is completed by a universally adjustable spherically formed shell 221 which is provided with a collar 222 carrying a flange 223. In like manner the universal joint 20 is housed in part by the inner spherically formed shell 224 and the outer spherically formed shell 225 permanently secured to the housing for the crank shaft which rotates the crank 27. Cooperating with the shells 224 and 225 is a spherically formed shell 226 having an enlarged tubular flange 227 thereon. The housing 211 comprises a tubular element 228 carried by the flange 223 and provided inwardly thereof with a tubular stop 229 permanently secured thereto as indicated by the welded connection 230. A second tubular housing member 231 is permanently secured within the tubular flange 227 as indicated by the welded connection 232 and is adapted to extend within the tubular stop 229. Carried at the opposite end of the tubular member 231 is an outwardly extending tubular stop 233 which is adapted to engage with the inwardly extending tubular stop 229 previously referred to. When the stops 233 and 229 are in engagement, further extension of the telescoping housing 211 and the telescoping torque transmitting shaft 210 is effectively prevented.

In this instance, instead of providing compression springs surrounding the torque transmitting shaft 210 and received within the housing 211, I provide a separate spring 240 secured to a lug 241 on the support 17 and connected at its opposite end as indicated at 242 to a bracket carried by the frame of the tractor.

In this embodiment of my invention I provide substantially identical means for effecting angular adjustment of the support 17 and hence of the shoe 18 and associated structure about a transverse horizontal axis. This comprises an arm 250 carried by the flange 227 and an arm 251 carried by the outer shell 225. An adjustable link 226 is provided for angularly adjusting the support 17 as previously described. Another change in this modification is in the omission of a bell crank 96 (Figure 3). In Figure 8 I have shown the cable 100 as passing under a pulley 260 and connected at its end to the vertically upstanding arm 90. When cable 100 is drawn rearwardly by lifting of lever 101, arm 90 (Figure 3) is swung, thus lifting the mower arm.

An important feature of the present invention is the structural arrangement which facilitates attachment and detachment of the entire mowing assembly. As well illustrated in Figure 1, the entire mowing apparatus is connected to the tractor at only three points. The housing 35, bolted or otherwise secured to the rear axle, supports the shaft 34, and also supports the rear end of the propeller shaft 210 and propeller housing 211. The bar 28 is connected to the tractor by the bracket 29, and assists in supporting the mower support 17 and the mower arm 22. The bracket 81 supports the manual lift lever 86, the bell crank 80 and the sheave 108. As will be readily apparent, if the brackets and housings 35, 81 and 29 are disengaged or released from the tractor, the entire mowing apparatus may be readily removed.

This arrangement of parts, by means of which the entire mowing apparatus may be removed upon releasing three supports, contributes substantially to the utility of the apparatus, inasmuch as it greatly facilitates attachment and detachment of the mowing apparatus.

What I claim as my invention is:

1. In a tractor-mower having a power take-off and a mower drive, means for transmitting power from said power take-off to said mower drive comprising a torque shaft having splined, telescoping members, a tubular housing for said shaft composed of telescoping tubular members, stop means on said tubular members limiting extension of said housing, and means to limit shortening of the housing including a coil compression spring in said housing and surrounding said shaft.

2. In a mowing machine, a tractor having a power take-off shaft, a sickle bar adjacent the tractor, and a driving connection between the power take-off shaft and sickle bar including spaced universal joints, one being operatively connected to the power take-off shaft, the other being operatively connected to the sickle bar, each of said universal joints having a stub section, a tube rigid with and projecting endwise from one of said stub sections, a shaft rigid with and projecting endwise from said tube, and a tube rigid with the other stub section and splined upon the shaft just mentioned, a protecting housing for said tubes and associated shaft including inner and outer spherically formed shells for said universal joints, spherically formed intermediate shells between and movable relative to the inner and outer shells, said intermediate shells having axially extending tubular portions provided with lateral flanges, telescoping tubes rigidly secured to said lateral flanges, and means for limiting extension of the housing including a nut adjustable on the outermost of said telescoping tubes at its free end and provided beyond said free end with an inwardly projecting shoulder, and a collar fixed to the innermost of said telescoping tubes at its free end and engageable with said shoulder.

3. In a mowing machine, a tractor having a power take-off shaft, a sickle bar adjacent the tractor, and a driving connection between the power take-off shaft and sickle bar including spaced universal joints, one being operatively connected to the power take-off shaft, the other being operatively connected to the sickle bar, each of said universal joints having a stub section, a tube rigid with and projecting endwise from one of said stub sections, a shaft rigid with and projecting endwise from said tube, and a tube rigid with the other stub section and splined upon the shaft just mentioned, a protecting housing for said tubes and associated shaft including inner and outer spherically formed shells for said universal joints, spherically formed intermediate shells between and movable relative to the inner and outer shells, said intermediate shells having axially extending tubular portions provided with lateral flanges, telescoping tubes rigidly secured to said lateral flanges, means for limiting extension of the housing including a nut adjustable on the outermost of said telescoping tubes at its free end and provided beyond said free end with an inwardly projecting shoulder, and a collar fixed to the innermost of said telescoping tubes at its free end and engageable with said shoulder, and means normally maintaining the telescoping tubes in limited extended position as aforesaid including a compression spring sleeved upon the first two mentioned tubes within the telescoping tubes and having opposite ends thereof abutting the lateral flanges of said telescoping tubes.

4. In a tractor mower having a power take-off and a mower drive; means for transmitting power from the power take-off to the mower drive comprising spaced universal joints, and telescoping driving means extending between said universal joints, and a housing for said universal joints and telescoping driving means comprising universally mounted spherical caps for said universal joints, each having a tubular part provided with a flange, a tube rigid with one of said flanges and sleeved upon the telescoping driving means, a tube rigid with the other of said flanges and telescoping the first mentioned tube, an abutment on one of said tubes at its free end, and a nut adjustable on the other tube at its free end and having a shoulder engageable with the abutment to limit extension of the housing.

5. In a tractor mower having a power take-off and a mower drive; means for transmitting power from the power take-off to the mower drive comprising spaced universal joints, and telescoping driving means extending between said universal joints, and a housing for said universal joints and telescoping driving means comprising universally mounted spherical caps for said universal joints, telescoping tubes enclosing said telescoping driving means, rigid anchorage means on said caps for the remote ends of said tubes, one of said tubes having an abutment at its free end, and a nut adjustably mounted on the other tube at its free end and having a shoulder engageable with said abutment to limit extension of the housing.

6. In a tractor mower having a power take-off and a mower drive; means for transmitting power from the power take-off to the mower drive comprising spaced universal joints, and telescoping driving means extending between said universal joints, and a housing for said universal joints and telescoping driving means comprising universally mounted spherical caps for said universal joints, telescoping tubes enclosing said telescoping driving means, rigid anchorage means on said caps for the remote ends of said tubes, one of said tubes having an abutment at its free end, a nut adjustably mounted on the other tube at its free end and having a shoulder engageable with said abutment to limit extension of the housing, and means normally retaining the abutment in engagement with the shoulder and adapted under abnormal conditions to yield and permit shortening of the housing, comprising a compression spring sleeved upon the telescoping driving means within the housing and having opposite ends thereof abutting portions of the caps.

7. In a tractor mower having a power take-off and a mower drive; means for transmitting power from the power take-off to the mower drive comprising spaced universal joints, and telescoping driving means extending between said universal joints, a housing for said universal joints and telescoping driving means comprising universally mounted spherical caps for said universal joints, telescoping tubes enclosing said telescoping driving means, and rigid anchorage means on said caps for the remote ends of said tubes, one of said tubes having an abutment at its free end, a nut adjustably mounted on the other tube at its free end and having a shoulder engageable with said abutment to limit extension of the housing, and means normally retaining the abutment in engagement with the shoulder and adapted under abnormal conditions to yield and permit shortening of the housing, comprising a compression spring sleeved upon the telescoping driving means within the housing and having opposite ends thereof abutting portions of the caps, the dimensions of the spring being such that adjacent convolutions thereof may contact with each other to limit collapse of the housing.

8. In a tractor mower having a clutch actuating shaft, a pivotally mounted lever operatively connected to said shaft, and a mower support; means operable by the support for actuating the shaft comprising a pin carried by the lever, a bracket carried by the support, a rod slidably engaging said bracket, a bar extending endwise from the rod and having a notch for the pin, and a coil spring sleeved on the rod and abutting the bracket and bar.

9. In a mowing machine, a tractor having a power take-off shaft, a clutch, and a clutch operating member, a sickle bar adjacent the tractor, a driving connection between the power take-off and sickle bar including a propeller shaft, a housing for said propeller shaft, an arm rigid with said housing, and means for actuating the clutch operating member to render the clutch of the tractor inoperative, including a bracket secured to the arm, a pivotally mounted lever carried by the tractor and operatively connected to the clutch operating member, and an operating connection between the bracket and lever including a rod slidably engaging the bracket, a bar extending endwise from the rod and operatively connected to the lever, and a spring sleeved on the rod and bearing against the bar and bracket.

10. In a mowing machine, a tractor having a power take-off shaft, a clutch, and a clutch operating member, a sickle bar adjacent the tractor, a driving connection between the power take-off and sickle bar including a propeller shaft, a housing for said propeller shaft, an arm rigid with said housing, and means for actuating the clutch operating member to render the clutch of the tractor inoperative, including a bracket secured to the arm, a pivotally mounted lever carried by the tractor and operatively connected to the clutch operating member, and an operating connection between the bracket and lever including a pin on the lever, a rod slidably engaging the bracket, a bar extending endwise from the rod and having a notch receiving said pin, and a spring sleeved on the rod and bearing against the bar and bracket.

11. In a tractor mower having a power take-off and a mower drive; means for transmitting power from the power take-off to the mower drive comprising spaced universal joints, and telescoping driving means extending between said universal joints, and a housing for said universal joints and telescoping driving means comprising universally mounted spherical caps for said universal joints, telescoping tubes enclosing said telescoping driving means, rigid anchorage means on said caps for the remote ends of said tubes, and stops rigid with said tubes at the free ends thereof and engageable with each other to limit extension of the housing.

12. In a tractor mower having a power take-off and a mower drive; means for transmitting power from the power take-off to the mower drive comprising spaced universal joints, and telescoping driving means extending between said universal joints, and a housing for said universal joints and telescoping driving means comprising universally mounted spherical caps for said universal joints, telescoping tubes enclosing said telescoping driving means, rigid anchorage means on said caps for the remote ends of said tubes, a tubular stop rigid with one tube at its free end and sleeved upon the second tube, and a tubular stop rigid with the second tube within the first mentioned tube and engageable with the first mentioned stop to limit extension of the housing.

13. In a tractor mower having a power take-off and a mower drive; means for transmitting power from the power take-off to the mower drive comprising spaced universal joints, and telescoping driving means extending between said universal joints, and a housing for said universal joints and telescoping driving means comprising universally mounted spherical caps for said universal joints, telescoping tubes enclosing said telescoping driving means, rigid anchorage means on said caps for the remote ends of said tubes, and stops carried by said tubes at the free ends thereof and engageable with each other to limit extension of the housing, and yieldable means outside the housing and operatively connected to the latter to resist collapse of the housing.

14. In a moving machine, a tractor having a power take-off shaft, a sickle bar, and a driving connection between the power take-off shaft and sickle bar including spaced universal joints, one being operatively connected to the power take-off shaft, the other being operatively connected to the sickle bar, each of said universal joints having a stub shaft, a tube rigid with and projecting endwise from one of said stub shafts, a shaft rigid with and projecting endwise from said tube, and a tube rigid with the other stub shaft and splined upon the shaft just mentioned in spaced relation to the first mentioned tube.

15. In a tractor mower having a power take-off and a mower drive; means for transmitting power from the power take-off to the mower drive comprising spaced universal joints, each having a stub shaft, torque transmitting tubes rigid with and projecting endwise from said stub shafts, said tubes extending toward but terminating short of each other, one of said tubes being splined, the other of said tubes being unsplined, and a shaft rigid with and projecting endwise from the unsplined tube, the free end of said last mentioned shaft being splined and engaging the splined part of the first mentioned tube in spaced relation to one of the stub shafts aforesaid.

16. In a mowing machine, a tractor having a power take-off shaft, a sickle bar adjacent the tractor, and a driving connection between the power take-off shaft and sickle bar including spaced universal joints, one being operatively connected to the power take-off shaft, the other being operatively connected to the sickle bar, each of said universal joints having a stub shaft, a tube rigid with and projecting endwise from one of said stub shafts, a shaft rigid with and projecting endwise from said tube, and a tube rigid with the other stub shaft and splined upon the shaft just mentioned in spaced relation to the first mentioned tube, and a protecting housing for said tubes and associated shaft including universally mounted caps for the universal joints having axially extending tubular portions provided with lateral flanges, and telescoping tubes enclosing said tubes and shaft aforesaid and having their remote ends rigidly secured to said lateral flanges.

17. In a mowing machine, a tractor having a power take-off shaft, a sickle bar, and a driving connection between the power take-off shaft and sickle bar including spaced universal joints, one being operatively connected to the power take-off shaft, the other being operatively connected to the sickle bar, each of said universal joints having a stub shaft, a tube rigid with and projecting endwise from one of said stub shafts, a shaft rigid with and projecting endwise from said tube, a tube rigid with the other stub shaft and splined upon the shaft just mentioned in spaced relation to the first mentioned tube, and a protecting housing for said tubes and associated shaft including spherically formed shells for the universal joints having tubular portions concentric with said tubes, and telescoping tubes carried by said tubular portions and enclosing the tubes and shaft aforesaid.

18. In a tractor mower having a power take-off and a mower drive; means for transmitting power from the power take-off to the mower drive comprising spaced universal joints, each having a stub shaft, torque transmitting tubes rigid with and projecting endwise from said stub shafts, said tubes extending toward but terminating short of each other, one of said tubes being splined, the other of said tubes being unsplined, a shaft rigid with and projecting endwise from the unsplined tube, the free end of said last mentioned shaft being splined and engaging the splined part of the first mentioned tube in spaced relation to one of the stub shafts aforesaid, and a protecting housing for said tubes and associated shaft including spherically formed shells for the universal joints having tubular portions concentric with said tubes, and telescoping tubes carried by said tubular portions and enclosing the tubes and shaft aforesaid.

19. In a mowing machine, a tractor having a power take-off shaft, a sickle bar, and a driving connection between the power take off shaft and sickle bar including spaced universal joints, one being operatively connected to the power take-off shaft, the other being operatively connected to the sickle bar, each of said universal joints having a stub shaft, a tube rigid with and projecting endwise from one of said stub shafts, a shaft rigid with and projecting endwise from said tube, a tube rigid with the other stub shaft and splined upon the shaft just mentioned in spaced relation to the first mentioned tube, and a protecting housing for said tubes and associated shaft including universally mounted spherically formed shells for the universal joints having tubular portions concentric with said tubes and provided with lateral flanges, and telescoping tubes carried by said lateral flanges and enclosing the tubes and shaft aforesaid.

HOWARD W. SIMPSON.